(12) United States Patent
Hubbard et al.

(10) Patent No.: US 11,780,559 B1
(45) Date of Patent: Oct. 10, 2023

(54) TRANSLATING FLIGHT CONTROL SURFACE FOR AIRCRAFT

(71) Applicant: The Boeing Company, Chicago, IL (US)

(72) Inventors: Andrew J. Hubbard, Saint Charles, MO (US); Richard C. Potter, Huntington Beach, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/658,375

(22) Filed: Apr. 7, 2022

(51) Int. Cl.
*B64C 9/02* (2006.01)
*B64C 9/14* (2006.01)

(52) U.S. Cl.
CPC .......... *B64C 9/02* (2013.01); *B64C 2009/143* (2013.01)

(58) Field of Classification Search
CPC .......................... B64C 9/02; B64C 2009/143
See application file for complete search history.

(56) References Cited

U.S. PATENT DOCUMENTS

| | | | | |
|---|---|---|---|---|
| 2,556,326 A | * | 6/1951 | Grant | B64C 9/16 244/216 |
| 6,299,108 B1 | * | 10/2001 | Lindstrom | B64D 45/0005 244/99.3 |
| 2005/0230565 A1 | * | 10/2005 | Kallinen | B64C 23/06 244/217 |
| 2007/0267541 A1 | * | 11/2007 | Honorato Ruiz | B64C 9/02 244/99.3 |
| 2020/0255124 A1 | * | 8/2020 | Tessier | B64C 9/00 |

* cited by examiner

*Primary Examiner* — Rodney A Bonnette
(74) *Attorney, Agent, or Firm* — Quinn IP Law

(57) ABSTRACT

An aerodynamic device includes a main aerodynamic body having a leading edge and a trailing edge, a flight control surface coupled to the main aerodynamic body near the trailing edge of the main aerodynamic body, and a translating body coupled to the flight control surface. The translating body is moveable relative to the flight control surface between a sealed position and a retracted position to define a gap. The translating body is extended toward the main aerodynamic body while in the sealed position to close the gap. The translating body is retracted away from the main aerodynamic body while in the retracted position to widen the gap. The gap adjusts an airflow flowing between the main aerodynamic body and the flight control surface.

20 Claims, 9 Drawing Sheets

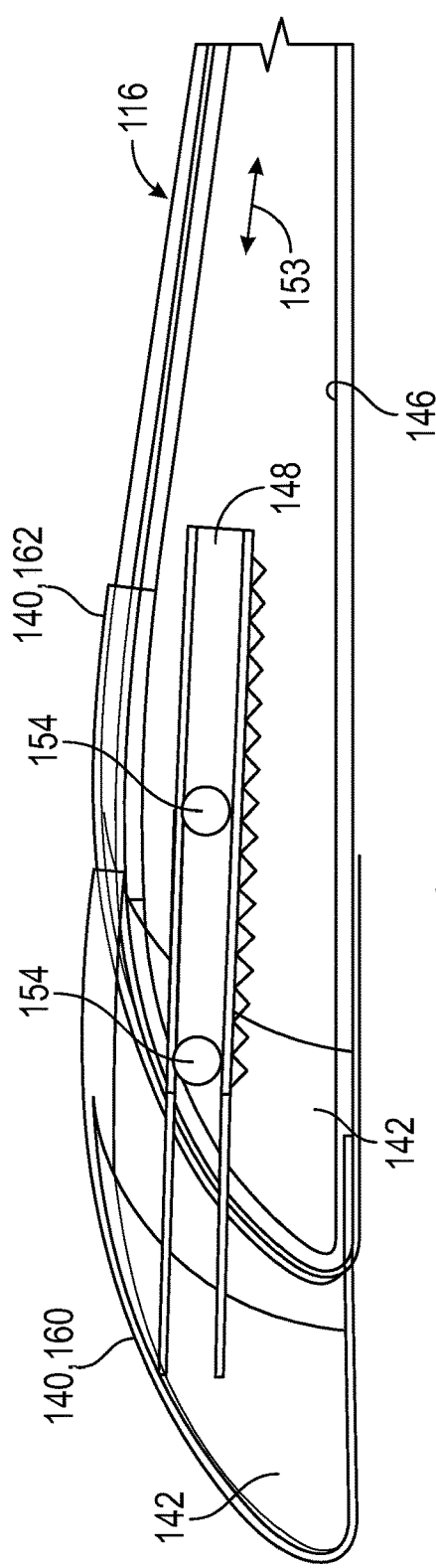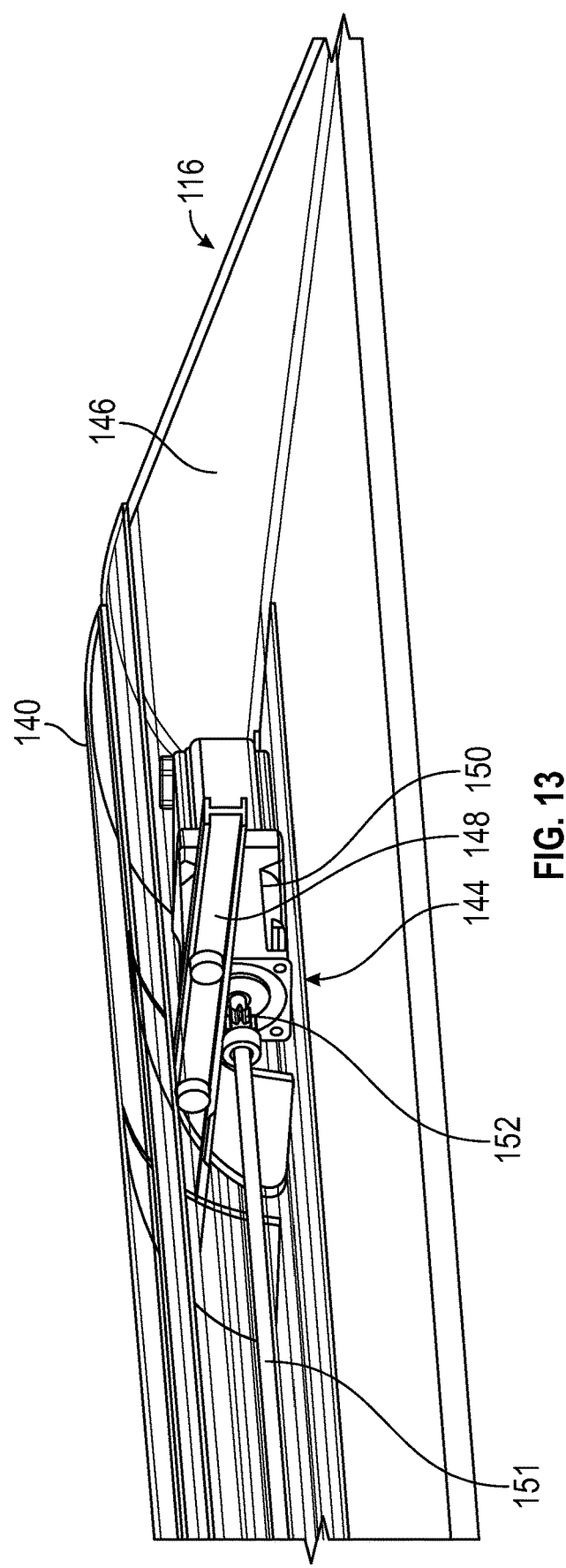

TRANSLATING FLIGHT CONTROL SURFACE FOR AIRCRAFT

TECHNICAL FIELD

The present disclosure generally relates to aircraft. In particular, the present disclosure describes a translating flight control surface for aircraft.

BACKGROUND

Aircraft include flight control surfaces. These flight control surfaces may move relative to a stationary structure of the aircraft to facilitate changes to the aircraft speed or orientation during flight. It is therefore desirable to continue research and development efforts to improve flight control surfaces.

SUMMARY

An aerodynamic device is disclosed herein. The aerodynamic device includes a main aerodynamic body, a flight control surface, and a translating body. The main aerodynamic body has a leading edge and a trailing edge opposite the leading edge. The flight control surface is coupled to the main aerodynamic body proximate the trailing edge of the main aerodynamic body. The translating body is coupled to the flight control surface. The translating body is movable relative to the flight control surface between a sealed position and a retracted position to define a gap between the main aerodynamic body and the translating body. The translating body is extended toward the main aerodynamic body while in the sealed position to close the gap. The translating body is retracted away from the main aerodynamic body while in the retracted position to widen the gap. The gap adjusts an airflow flowing between the main aerodynamic body and the flight control surface.

In one or more embodiments of the aerodynamic device, the flight control surface is pivotally coupled to the main aerodynamic body to facilitate pivotal movement of the flight control surface relative to the main aerodynamic body between a cruise configuration and a deflected configuration. The translating body is in the sealed position while the flight control surface is in the cruise configuration. The translating body is in the retracted position while the flight control surface is in the deflected configuration.

In one or more embodiments of the aerodynamic device, the flight control surface is aligned with a plane defined by the main aerodynamic body while in the cruise configuration. The flight control surface is obliquely angled relative to the plane defined the main aerodynamic body while in the deflected configuration.

In one or more embodiments, the aerodynamic device further includes a hinge pivotally coupling the flight control surface to the main aerodynamic body. The hinge remains inside the main aerodynamic body while the flight control surface moves between the cruise configuration and the deflected configuration.

In one or more embodiments, the aerodynamic device further includes an actuator coupled to the translating body and disposed within the flight control surface. Upon actuation of the actuator, the translating body moves relative to the flight control surface.

In one or more embodiments of the aerodynamic device, the main aerodynamic body is one of a wing, a horizontal stabilizer, a vertical stabilizer, or a canard.

In one or more embodiments of the aerodynamic device, the flight control surface is one of a flap, a flaperon, an aileron, an elevator, a rudder, or a ruddervator In one or more embodiments, the aerodynamic device further includes a shroud pivotally coupled to the main aerodynamic body and configured to further define the gap.

In one or more embodiments of the aerodynamic device, a rotation between the shroud and the main aerodynamic body defines an overlap between an aftmost point on the shroud and a forward most point of the translating body that further adjusts the airflow.

In one or more embodiments of the aerodynamic device, the aerodynamic device is characterized by an absence of an external bump located where the flight control surface is coupled to the main aerodynamic body. The external bump protrudes from the flight control surface.

An aircraft is provided herein. The aircraft includes a fuselage and a wing. The wing coupled to the fuselage. The wing includes a main aerodynamic body, a flight control surface, and a translating body. The main aerodynamic body has a leading edge and a trailing edge opposite the leading edge. The flight control surface is coupled to the main aerodynamic body near the trailing edge of the main aerodynamic body. The translating body is coupled to the flight control surface. The translating body is translatable relative to the flight control surface between a sealed position and a retracted position to define a gap between the main aerodynamic body and the translating body. The translating body is extended toward the main aerodynamic body while in the sealed position to close the gap. The translating body is retracted away from the main aerodynamic body while in the retracted position to widen the gap. The gap adjusts an airflow flowing between the main aerodynamic body and the flight control surface.

In one or more embodiments of the aircraft, the flight control surface is pivotally coupled to the main aerodynamic body to facilitate pivotable movement of the flight control surface relative to the main aerodynamic body between a cruise configuration and a deflected configuration. The translating body is in the sealed position while the flight control surface is in the cruise configuration. The translating body is in the retracted position while the flight control surface is in the deflected configuration.

In one or more embodiments of the aircraft, the flight control surface is aligned with a plane defined by the main aerodynamic body while in the cruise configuration. The flight control surface is obliquely angled relative to the plane defined the main aerodynamic body while in the deflected configuration.

In one or more embodiments, the aircraft further includes a hinge pivotally coupling the flight control surface to the main aerodynamic body. The hinge remains inside the main aerodynamic body while the flight control surface moves between the cruise configuration and the deflected configuration.

In one or more embodiments, the aircraft further includes an actuator coupled to the translating body and disposed within the flight control surface. Upon actuation of the actuator, the translating body moves relative to the flight control surface.

In one or more embodiments of the aircraft, the main aerodynamic body is one of a wing, a horizontal stabilizer, a vertical stabilizer, or a canard.

In one or more embodiments of the aircraft, the flight control surface is one of a flap, a flaperon, an aileron, an elevator, a rudder, or a ruddervator.

In one or more embodiments, the aircraft further includes a shroud pivotally coupled to the main aerodynamic body and configured to further define the gap, In one or more embodiments of the aircraft, a rotation between the shroud and the main aerodynamic body defines an overlap between an aftmost point on the shroud and a forward most point of the translating body that further adjusts the airflow.

A method for aerodynamic control is provided herein. The method includes coupling a flight control surface to a main aerodynamic body proximate a trailing edge of the main aerodynamic body, and coupling a translating body to the flight control surface. The translating body is moveable relative to the flight control surface between a sealed position and a retracted position to define a gap between the main aerodynamic body and the translating body. The method includes extending the translating body toward the main aerodynamic body while in the sealed position to close the gap, and retracting the translating body is away from the main aerodynamic body while in the retracted position to widen the gap. The gap adjusts an airflow flowing between the main aerodynamic body and the flight control surface.

The above features and advantages and other features and advantages of the present teachings are readily apparent from the following detailed description of the modes for carrying out the present teachings when taken in connection with the accompanying drawings.

BRIEF DESCRIPTION OF THE DRAWINGS

The accompanying drawings, which are incorporated into and constitute a part of this specification, illustrate implementations of the disclosure and together with the description, serve to explain the principles of the disclosure.

FIG. 12 is a schematic side view of a portion of the translating body and the flight control surface.

FIG. 13 is a schematic perspective view of another portion of the translating body and the flight control surface.

DETAILED DESCRIPTION

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

The effectiveness of trailing-edge flight control surfaces may be enhanced by establishing a gap between a fixed portion of the main aerodynamic body and a moving structure of a trailing-edge flight control surface. A proper gap and overlap are typically established using a hinge line that is off the body of the main aerodynamic body, or by other external mechanisms, to support and position the trailing-edge flight control surface. An external fairing, or bump, outside the main aerodynamic body typically houses the mechanisms. An elimination of the bumps external to the main aerodynamic shape may reduce the related drag at cruise conditions. Existing designs for simple flap hinges within the main aerodynamic body preclude the creation of an effective gap between the main aerodynamic body and the trailing-edge flight control surface while deployed. Various embodiments of the present disclosure relate to a mechanism that enables the creation of an effective gap and overlap for a bump-less, hinged trailing-edge flight control surface through a translation of a forward portion of the flight control surface while deployed.

Figure 1:
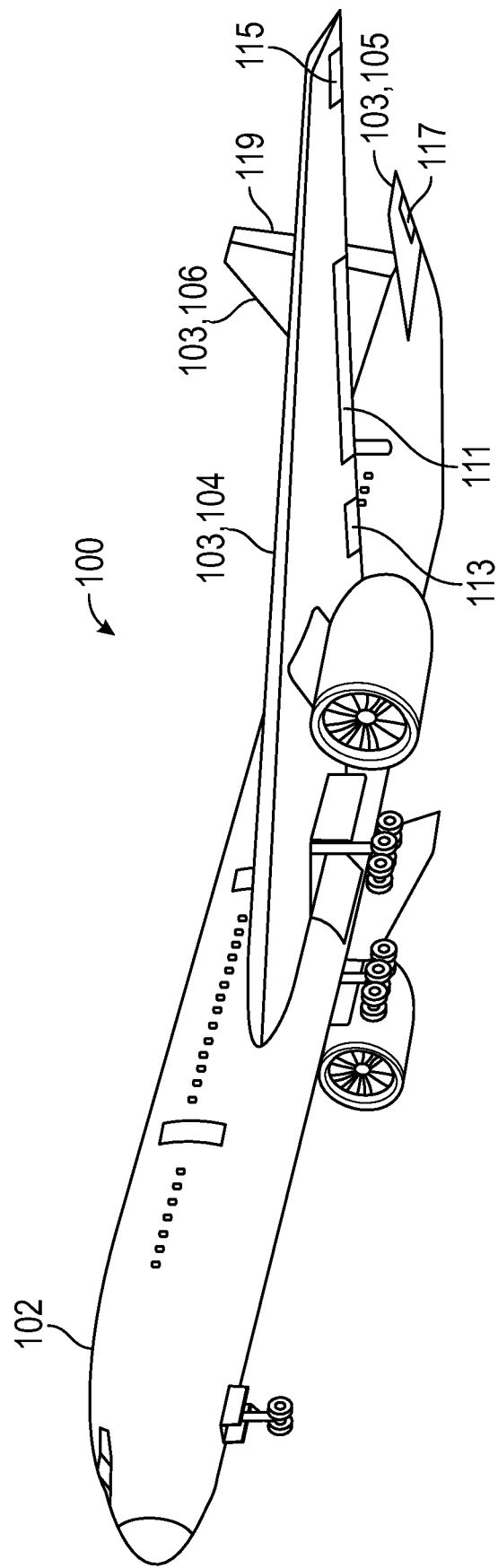
FIG. 1 is a schematic isometric view of an aircraft including a plurality of aerodynamic surfaces.

With reference to FIG. 1, an aircraft 100 includes a fuselage 102 and one or more aerodynamic devices 103, such as a wing 104, a horizontal stabilizer 105, and/or a vertical stabilizer 106, coupled to the fuselage 102. The wing 104, the horizontal stabilizer 105, or the vertical stabilizer 106 may be referred to individually as an aerodynamic body. Other common names for these aerodynamic devices include, but are not limited to tail surfaces, fins, canards, rudders, elevators, etc. The wing 104 includes one or more sets of flaps 111, one or more sets of flaperons 113, and/or one or more sets of ailerons 115. The horizontal stabilizer 105 as illustrated includes an elevator 117. The vertical stabilizer 106 as illustrated includes a rudder 119.

Figure 2:
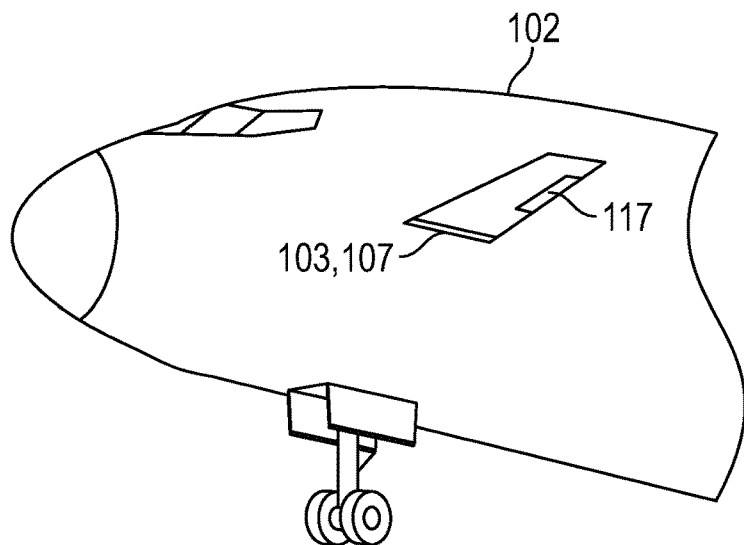
FIG. 2 is schematic partial isometric view of the aircraft including a canard.

With reference to FIG. 2, the aerodynamic devices 103 may include a canard 107. The canard 107 may include an elevator 117 on each side of the fuselage 102. The canard 107 is generally near a nose of the aircraft 100.

Figure 3:
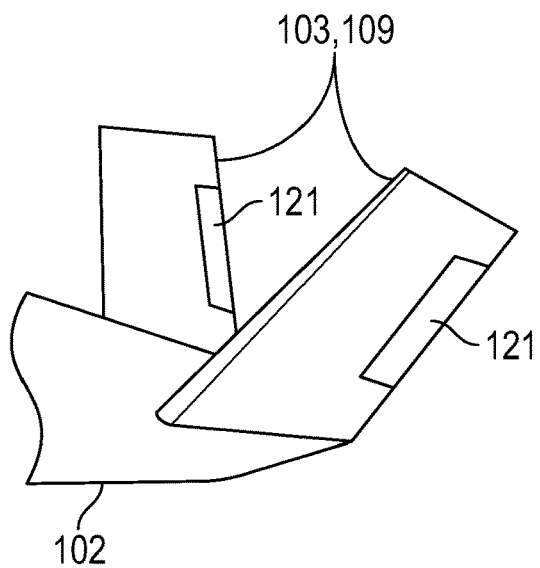
FIG. 3 is schematic partial isometric view of the aircraft including a v-tail.

With reference to FIG. 3, the aerodynamic devices 103 may include a v-tail 109. Each side of the v-tail 109 may include a ruddervator 121. The ruddervators 121 combine the functions of both the rudder 119 (FIG. 1) and the elevator 117 (FIG. 1). The v-tail 109 is located proximate a tail of the aircraft 100.

Figure 4:
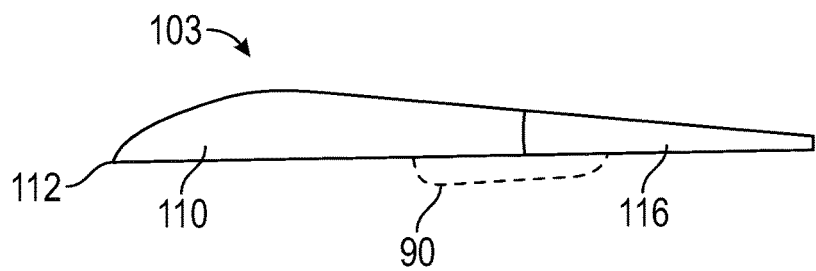
FIG. 4 is schematic cross-section side view of an aerodynamic device.
Figure 5:
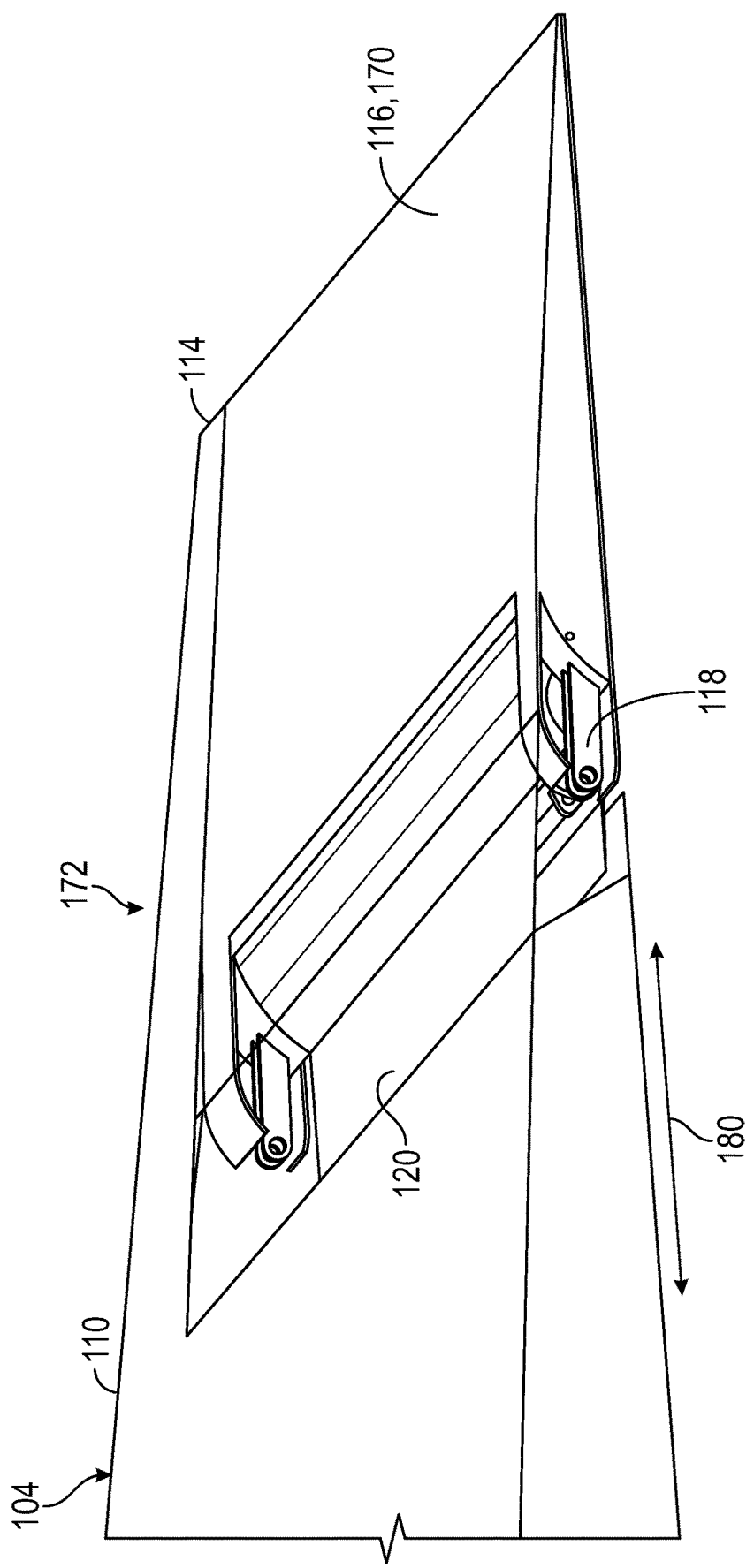
FIG. 5 is a schematic isometric view of the aerodynamic device in a cruise configuration.
Figure 6:
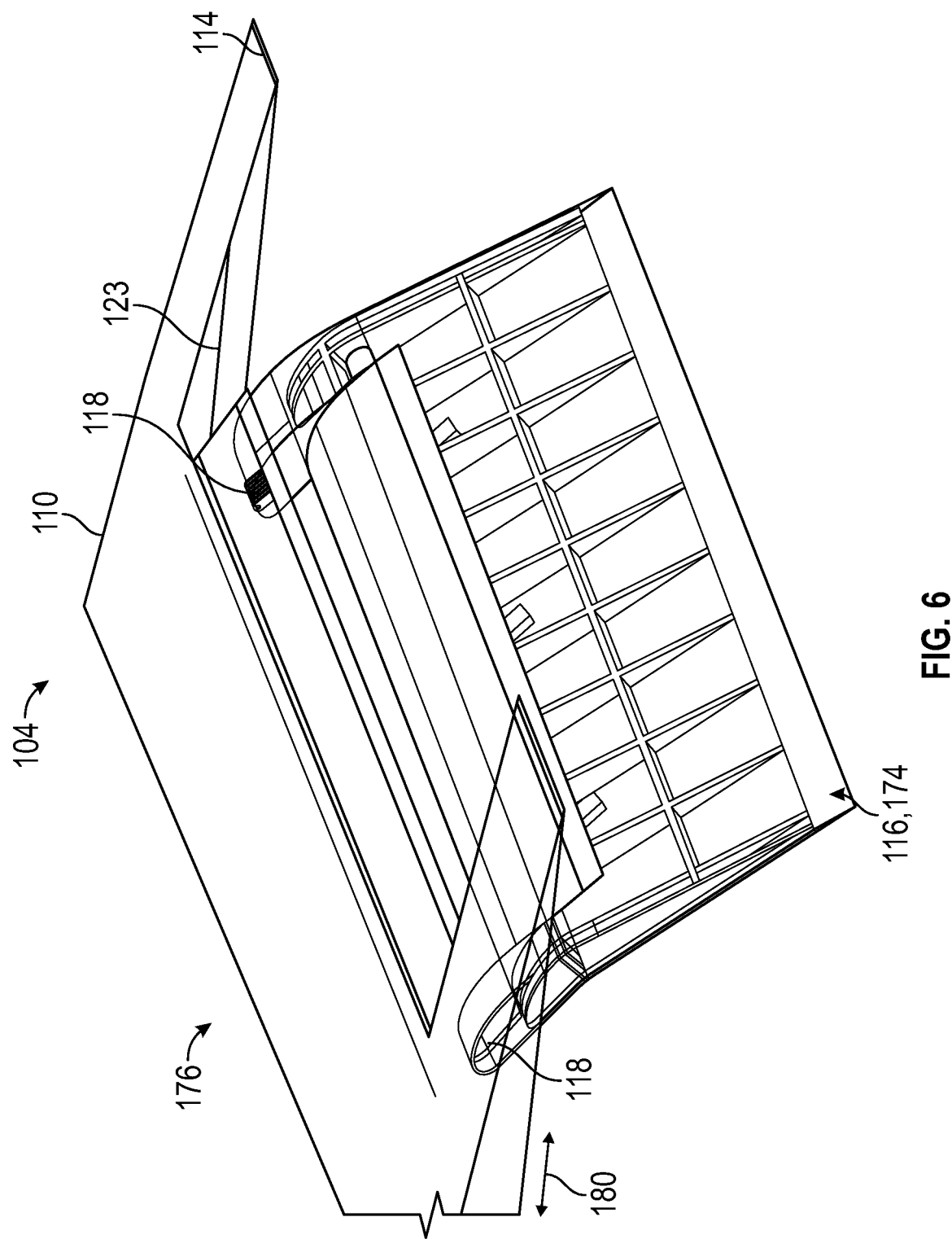
FIG. 6 is a schematic isometric view of the aerodynamic device in a deflected configuration.

With reference to FIGS. 4, 5, and 6, the aerodynamic device 103 includes a main aerodynamic body 110 having a leading edge 112 (FIG. 4) and a trailing edge 114 (FIG. 5). The trailing edge 114 is opposite the leading edge 112. The aerodynamic device 103 further includes a flight control surface 116 coupled near the trailing edge 114 of the main aerodynamic body 110. In other words, the flight control surface 116 is coupled at the aft end of the aerodynamic device 103 for at least some portion of the span of the aerodynamic device 103. As non-limiting examples, the flight control surface 116 may be configured as a flap 111, an aileron 115, or a flaperon 113, as illustrated in FIG. 1. The flight control surface 116 may also, for example, be configured as an elevator 117 (e.g., a horizontal stabilizer) or a rudder 119 (e.g., a vehicle stabilizer) as illustrated in FIGS. 1 and 2, or a ruddervator 121 for the aircraft 100 as illustrated in FIG. 3. Regardless of its configuration, the main aerodynamic body 110 has a recess 123 (FIG. 6) sized and shaped to partially receive the flight control surface 116 when stowed in a cruise position. The aerodynamic device 103 is characterized by a lack (or absence) of an external bump 90 located where the flight control surface 116 is coupled to the main aerodynamic body 110 protruding from (or extending away from) the flight control surface 116 and/or the main aerodynamic body 110.

Figure 7:
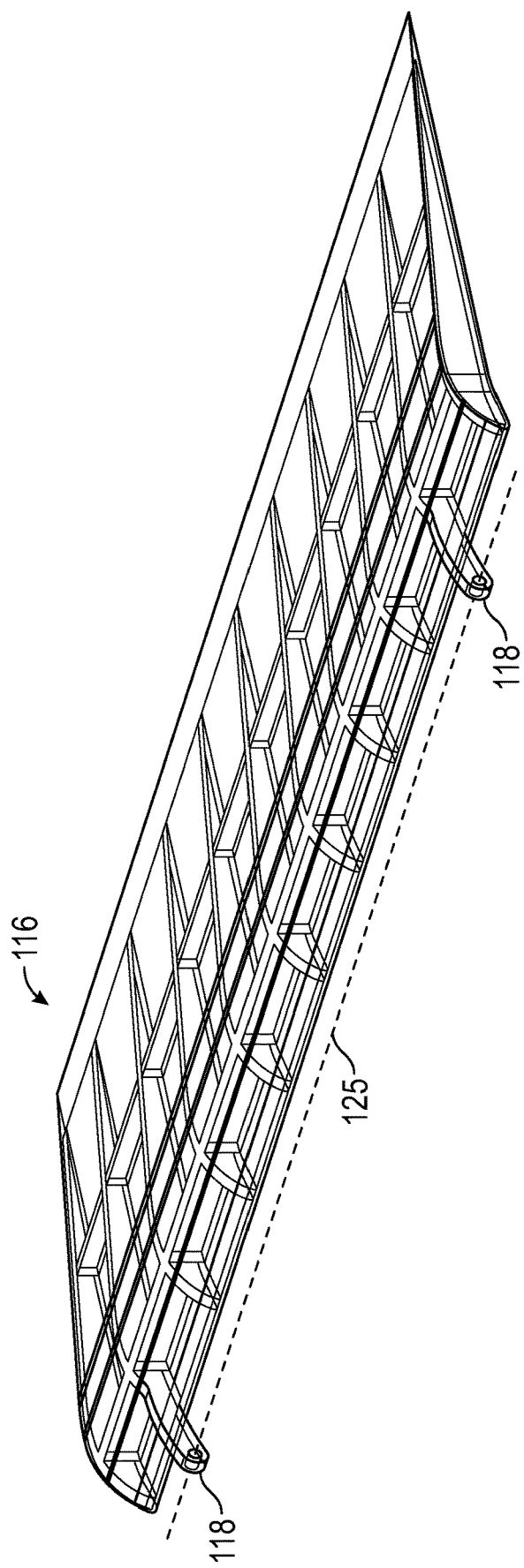
FIG. 7 is a schematic isometric view of a flight control surface of the aerodynamic device.

With reference to FIGS. 5, 6 and 7, the flight control surface 116 is movably coupled to the main aerodynamic body 110. As such, the flight control surface 116 is configured to move between a straight position 170 while in a cruise configuration 172 (FIG. 5) and a fully deflected position 174 while in a deflected configuration 176 (FIG. 6). The flight control surface 116 may move and stop at multiple deflected positions between the straight position 170 and the fully deflected position 174. In the fully deflected position 174, the flight control surface 116 is obliquely angled relative to a plane 180 of the main aerodynamic body 110 to promote additional force relative to its position. In the straight position 170, the flight control surface 116 is substantially parallel to the plane 180 of the main aerodynamic body 110 to limit resistance to forward propulsion of the aircraft 100. To facilitate movement between the straight position 170 and the fully deflected position 174, the flight control surface 116 is pivotally coupled to the main aerodynamic body 110. For example, the flight control surface 116 may include one or more hinges 118 that facilitate pivotal coupling of the main aerodynamic body 110 to the flight control surface 116. For example, the flight control surface 116 may include two hinges 118 disposed inboard and outboard, and aligned along an axis of rotation 125 (FIG. 7). It is contemplated, however, that the flight control surface 116 may not move along a single axis. The flight control surface 116 may be rotated and translated using, for example, a four-bar linkage or other mechanism. The aerodynamic device 103 may include one or more suitable actuation mechanisms to move the flight control surface 116 (e.g., flap) relative to the main aerodynamic body 110. In various embodiments, the hinges 118 and/or mechanism may be located within the main aerodynamic body 110 to avoid implementation of the external bumps 90 (FIG. 4) to house the hinges 118 and/or mechanisms.

Figure 8:
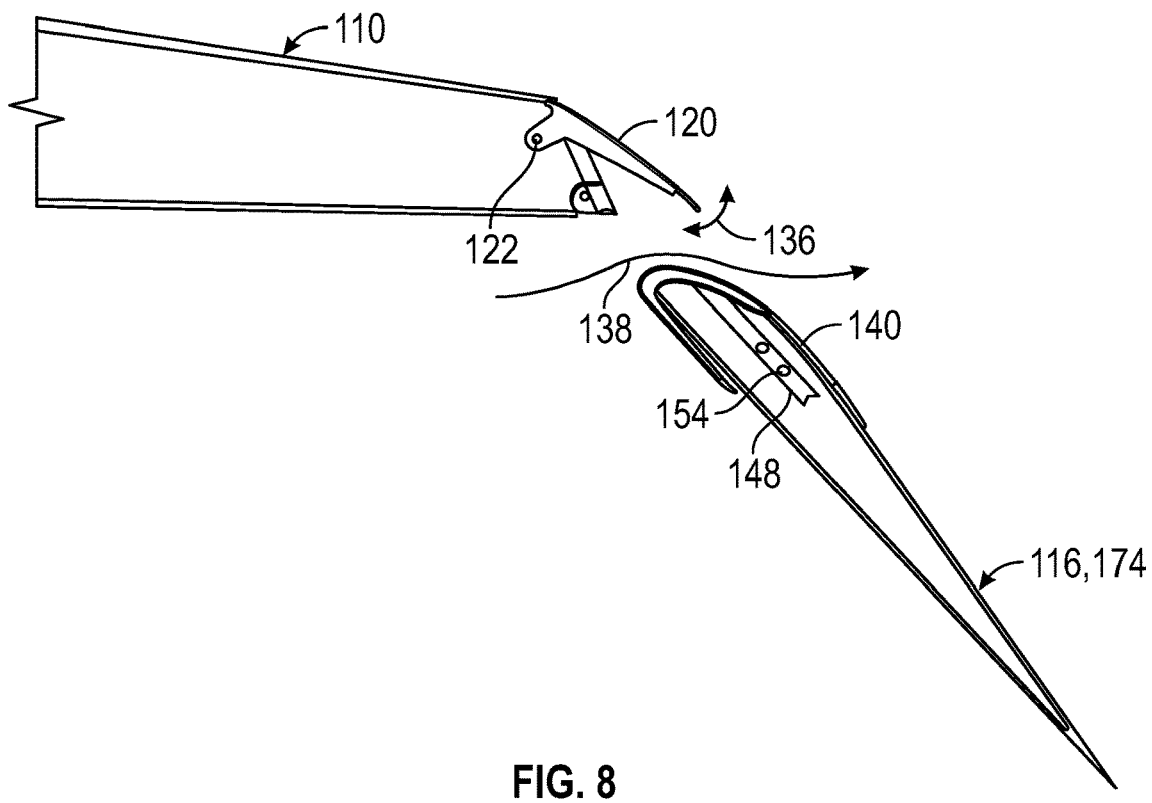
FIG. 8 is a schematic cross-section side view of the aerodynamic device showing the flight control surface in a fully deflected position and the translating body in a retracted position.
Figure 9:
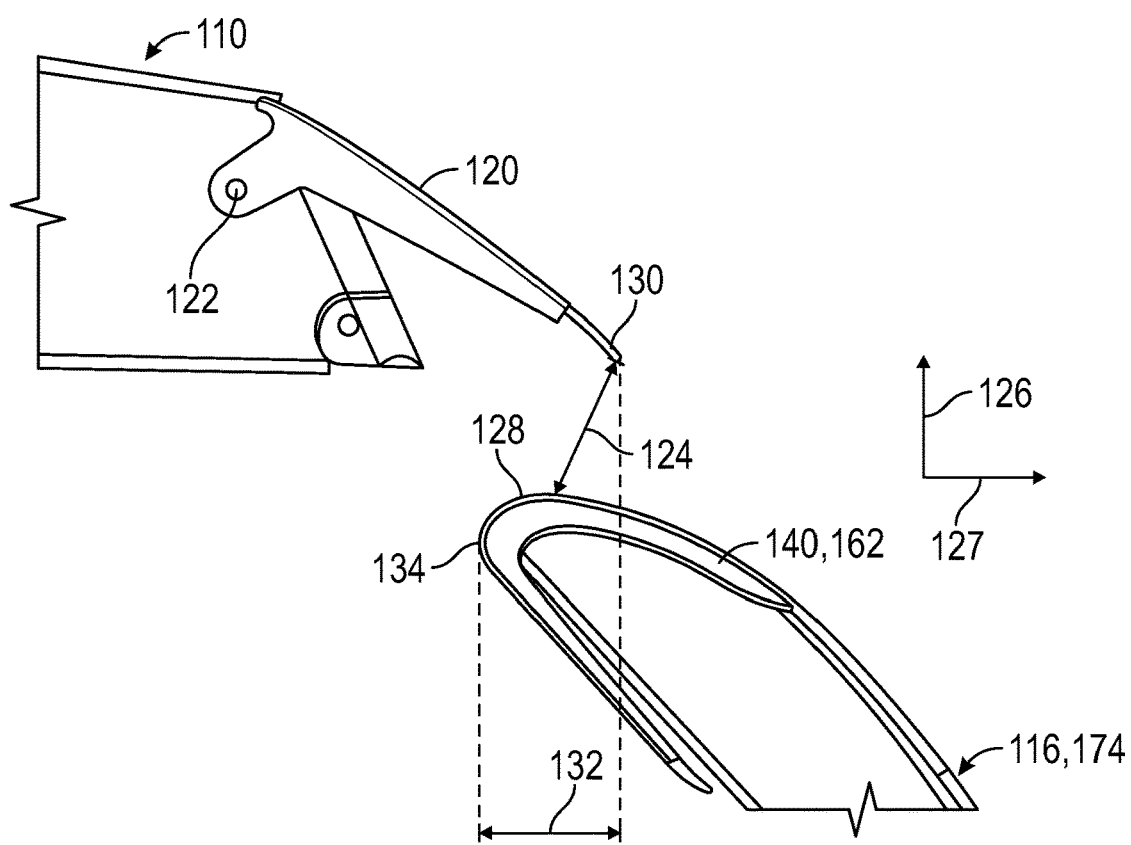
FIG. 9 is a schematic enlarged side view of the aerodynamic device.

With reference to FIGS. 8 and 9, an airflow 138 is enabled between the main aerodynamic body 110 and the flight control surface 116 while the flight control surface 116 is in a partially deflected position or the fully (shown) deflected position 174. A translating body 140 is moveable relative to and is coupled to the flight control surface 116. The translating body 140 is moved by a rack 148 sliding along one or more rollers 154. The airflow 138 is controlled by a gap 124 and an overlap 132 between the main aerodynamic body 110 and the translating body 140. Adjustment of the gap 124 and/or the overlap 132 changes the airflow 138 between the main aerodynamic body 110 and the translating body 140. The adjustment may be accomplished by the movement of the translating body 140 between the sealed position 160 (FIG. 10) and a retracted position 162 (FIG. 11). In the sealed position 160, the translating body 140 is in contact with (or close to) the main aerodynamic body 110 and so fills (or closes) the gap 124. In the retracted position 162, the translating body 140 is closer to the trailing edge of the flight control surface 116 and so opens (or widens) the gap 124.

The translating body 140 may be moved and held at various positions between the sealed position 160 and the retracted position 162 to vary the size of the gap 124 and thus vary the airflow 138.

The aerodynamic device 103 may include a shroud 120 that is pivotally coupled to the main aerodynamic body 110 and may be optionally configured as a spoiler. As a non-limiting example, a shroud hinge 122 may pivotally couple the shroud 120 to the main aerodynamic body 110. In various embodiments, the gap 124 may be defined as a minimum (or shortest) distance between the translating body 140 and the shroud 120 (e.g., the aftmost point 130). In other embodiments, a similar gap may be defined from an uppermost point 128 of the flight control surface 116 to the aftmost point 130 of the shroud 120 along a direction 126. The overlap 132 may be defined from a forward most point 134 of the flight control surface 116 to the aftmost point 130 of the shroud 120 along another direction 127. The direction 126 and the direction 127 may be orthogonal to each other.

The shroud 120 is configured to pivot relative to the main aerodynamic body 110 thru a rotation 136 to adjust the size of the overlap 132 and/or the gap 124, which affects the airflow 138 between the main aerodynamic body 110 and the flight control surface 116. It is desirable to adjust the airflow 138 between the main aerodynamic body 110 and the flight control surface 116 depending on the circumstances. Therefore, it is desirable to adjust the position of the shroud 120 relative to the flight control surface 116 to achieve various sizes for the overlap 132 and/or the gap 124.

Figure 10:
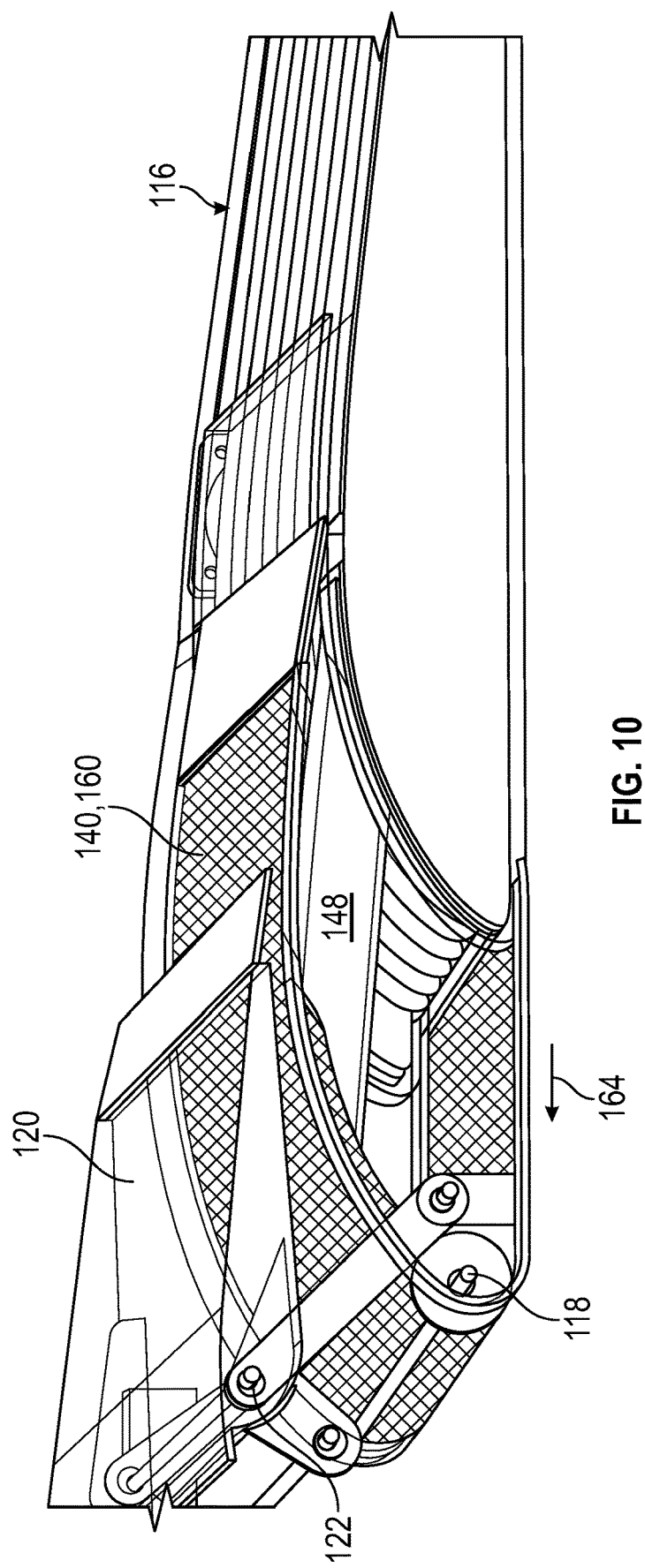
FIG. 10 is a schematic side view of the aerodynamic device showing the translating body in a sealed position.
Figure 11:
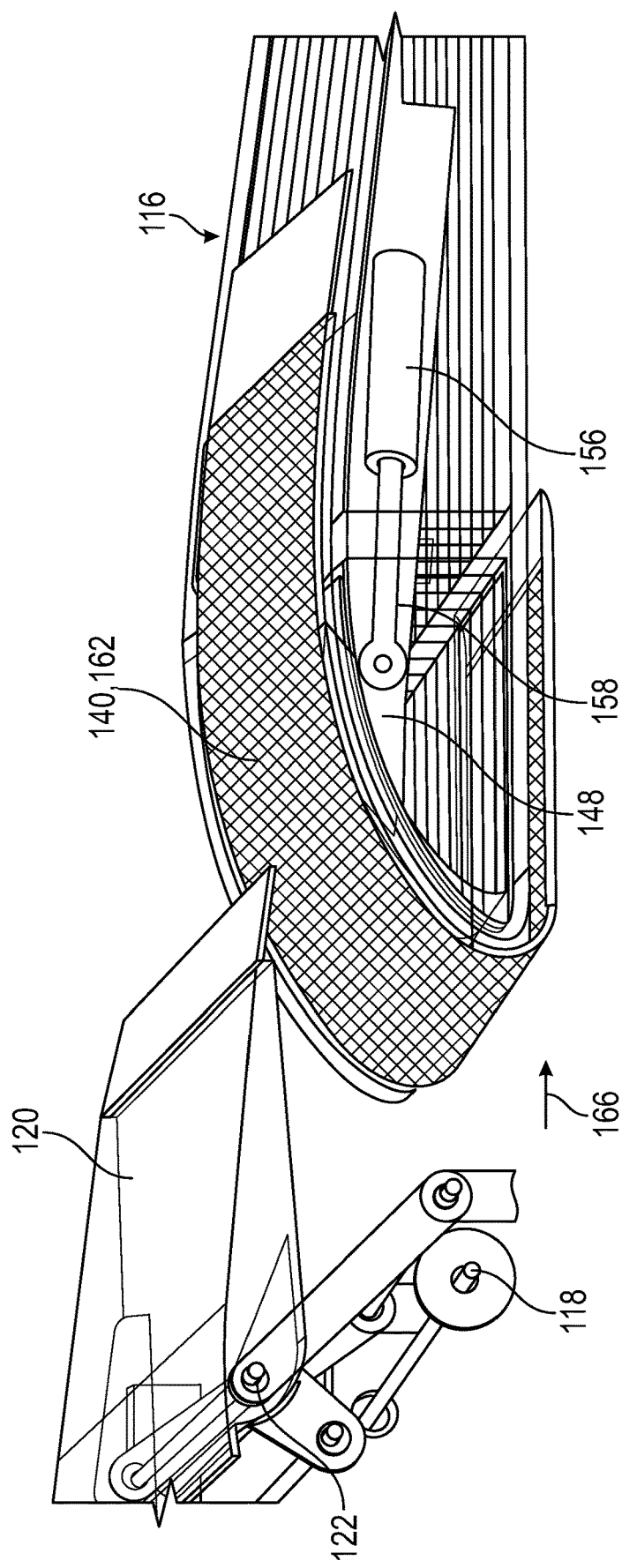
FIG. 11 is a schematic side view of the aerodynamic device showing the translating body in the retracted position.

With reference to FIGS. 10 and 11, the aerodynamic device 103 includes the translating body 140 coupled between the main aerodynamic body 110 and the flight control surface 116 (see also FIG. 6), the rack 148, a first actuator 156, and a rod 158. The first actuator 156 may implement a linear actuator. The translating body 140 is movable (e.g., translatable) relative to the flight control surface 116 between a sealed position 160 (FIG. 10) and a retracted position 162 (FIG. 11) to adjust the airflow 138 (FIG. 8) flowing between the main aerodynamic body 110 and the flight control surface 116. To do so, the translating body 140 is movably coupled to the flight control surface 116 through the rack 148, the rod 158 and the first actuator 156. From the retracted position 162, the translating body 140 may be extended 164 (FIG. 10) toward the sealed position 160. From the sealed position 160, the translating body 140 may be retracted 166 (FIG. 11) toward the retracted position 162. As a consequence, the translating body 140 is movable, for example substantially linearly, with respect to the flight control surface 116 between the sealed position 160 and the retracted position 162 to adjust the amount of the airflow 138 (FIG. 8) passing between the main aerodynamic body 110 and the flight control surface 116.

In the sealed position 160 (FIG. 10), the first actuator 156 extends the rod 158 that pushes the translating body 140 spatially closer to the main aerodynamic body 110 than in the retracted position 162. Put another way, the translating body 140 may be further from a trailing edge of the flight control surface 116 (not shown) while in the sealed position 160 than while in the retracted position 162. A leading edge of the translating body 140 may be tucked adjacent the shroud 120 while in the sealed position 160. In the retracted position 162 (FIG. 11), the first actuator 156 retracts the rod 158 that pulls the translating body 140 spatially apart from the main aerodynamic body 110. Put another way, the translating body 140 may be closer to the trailing edge of the flight control surface 116 while in the retracted position 162 than while in the sealed position 160.

In various embodiments, the translating body 140 is configured as a nose of the flight control surface 116 that is sized and shaped to partially cover the flight control surface 116. It is envisioned, however, that the translating body 140 may have other suitable configurations. By moving the translating body 140 between the sealed position 160 and the retracted position 162, the overlap 132 and the gap 124 (FIG. 9) may be adjusted to various sizes, thereby adjusting the airflow 138 between the main aerodynamic body 110 and the flight control surface 116. The ability to adjust the size of the overlap 132 and/or the gap 124 by moving the translating body 140 allows for the axis of rotation 125 (e.g., hinge line) of the flight control surface 116 to be inside the mold line of the aerodynamic device 103 or within the recess 123 of the main aerodynamic body 110. Accordingly, the aerodynamic device 103 does not implement the external bump 90 (FIG. 4), an external protuberance, or a mechanism external to the aerodynamic device 103 while the flight control surface 116 is stowed in the cruise configuration 172 (FIG. 5).

In various embodiments, the translating body 140 may not extend along the entire length of the flight control surface 116. Rather, one or more static portions of the translating body 140 may reside along a leading edge (e.g., left edge in the figures) of the flight control surface 116 and one or more translating bodies 140 are positioned between the static portions. For example, the outer ends of the leading edge of the flight control surface 116 may be static portions coupled to the hinges 118 (see FIG. 6) and the translating body 140 may occupy a remainder of the leading edge of the flight control surface 116.

With reference to FIG. 12, the translating body 140 includes one or more ribs 142 for enhancing the structural integrity of the translating body 140. The upper and lower surfaces of the translating body 140 may be covered by a static composite layup wrapping or aluminum skins. As a non-limiting example, about eighty percent of the upper and lower surfaces of the translating body 140 may be covered by the static composite layup wrapping. About twenty percent of the rear portion of the translating body 140 may be made of a flexible material, such as aerodynamic seal. The entire upper and lower surface could be a seal. There could also be a little seal (e.g., 5-10% of the upper side may be a seal). Furthermore, the translating body 140 may be pre-loaded to maintain contact with the flight control surface 116 while in both the retracted position 162 and the sealed position 160.

With reference to FIGS. 12 and 13, the flight control surface 116 includes a second actuator 144 coupled to the translating body 140 and disposed within the flight control surface 116. In various embodiments, the second actuator 144 may implement a linear actuator. Upon actuation of the second actuator 144, the translating body 140 moves approximately linearly relative to the flight control surface 116. The flight control surface 116 defines an interior cavity 146, and the second actuator 144 is at least partially disposed in the interior cavity 146 of the flight control surface 116. The second actuator 144 includes the rack 148 coupled to the translating body 140. In various embodiments, the rack 148 may be a geared rack. As a non-limiting example, the rack 148 may be directly coupled to one or more of the ribs 142 of the translating body 140 to structurally enhance the connection between the translating body 140 and the flight control surface 116. The second actuator 144 further includes an electric motor 150, a shaft 151 coupled to the electric motor 150, and one or more pinions 152 mounted on the shaft 151. Upon actuation of the electric motor 150, the pinion 152 rotates in unison with the shaft 151. The pinion 152 is meshed with the gears on the rack 148. Therefore, upon actuation of the electric motor 150, the translating body 140 moves along with the rack 148 relative to the flight control surface 116 in the direction 153.

The flight control surface 116 may also include one or more rollers 154 coupled to the rack 148. The rollers 154 remain stationary relative to the rack 148 and help guide the movement of the rack 148. The flight loads are driven primarily by a force on the surface of the flight control surface 116, that is perpendicular to the direction of motion of the rack 148. This force is taken out by the rollers 154 internal to the flight control surface 116. By moving the flight control surface 116 in a direction perpendicular to the primary flight loads, an actuation torque is reduced. Other mechanisms suitable to move the translating body 140 relative to the flight control surface 116 may be implemented to meet a design criteria of a particular application.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware that enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The terms "A," "an," "the," "at least one," and "one or more" are used interchangeably to indicate that at least one of the items is present. A plurality of such items may be present unless the context clearly indicates otherwise. Numerical values of parameters (e.g., of quantities or conditions) in this specification, unless otherwise indicated expressly or clearly in view of the context, including the appended claims, are to be understood as being modified by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, a disclosure of a range is to be understood as specifically disclosing multiple values and further divided ranges within the range.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

What is claimed is:

1. An aerodynamic device comprising:
   a main aerodynamic body having a leading edge and a trailing edge opposite the leading edge;
   a flight control surface coupled to the main aerodynamic body proximate the trailing edge of the main aerodynamic body;
   a translating body coupled to the flight control surface, wherein:
      the translating body is movable relative to the flight control surface between a sealed position and a retracted position to define a gap between main aerodynamic body and the translating body;
      the translating body is extended toward the main aerodynamic body while in the sealed position to close the gap;
      the translating body is retracted away from the main aerodynamic body while in the retracted position to widen the gap; and
      the gap adjusts an airflow flowing between the main aerodynamic body and the flight control surface; and
   an actuator coupled to the translating body and disposed within the flight control surface, wherein, upon actuation of the actuator, the translating body moves relative to the flight control surface.

2. The aerodynamic device of claim 1, wherein:
   the flight control surface is pivotally coupled to the main aerodynamic body to facilitate pivotal movement of the flight control surface relative to the main aerodynamic body between a cruise configuration and a deflected configuration;
   the translating body is in the sealed position while the flight control surface is in the cruise configuration; and
   the translating body is in the retracted position while the flight control surface is in the deflected configuration.

3. The aerodynamic device of claim 2, wherein:
   the flight control surface is aligned with a plane defined by the main aerodynamic body while in the cruise configuration; and
   the flight control surface is obliquely angled relative to the plane defined the main aerodynamic body while in the deflected configuration.

4. The aerodynamic device of claim 2, further comprising a hinge pivotally coupling the flight control surface to the main aerodynamic body, wherein the hinge remains inside the main aerodynamic body while the flight control surface moves between the cruise configuration and the deflected configuration.

5. The aerodynamic device of claim 1, wherein the main aerodynamic body is one of a wing, a horizontal stabilizer, a vertical stabilizer, or a canard.

6. The aerodynamic device of claim 1, wherein the flight control surface is one of a flap, a flaperon, an aileron, an elevator, a rudder, or a ruddervator.

7. The aerodynamic device of claim 1, further comprising a shroud pivotally coupled to the main aerodynamic body and configured to further define the gap.

8. The aerodynamic device of claim 7, wherein a rotation between the shroud and the main aerodynamic body adjusts an overlap between an aftmost point on the shroud and a forward most point of the translating body that further adjusts the airflow.

9. An aircraft comprising:
   a fuselage; and
   a wing coupled to the fuselage, wherein the wing comprises:
      a main aerodynamic body having a leading edge and a trailing edge opposite the leading edge;
      a flight control surface coupled to the main aerodynamic body near the trailing edge of the main aerodynamic body;
      a translating body coupled to the flight control surface, wherein:
         the translating body is translatable relative to the flight control surface between a sealed position and a retracted position to define a gap between the main aerodynamic body and the translating body;
         the translating body is extended toward the main aerodynamic body while in the sealed position to close the gap;
         the translating body is retracted away from the main aerodynamic body while in the retracted position to widen the gap; and
         the gap adjusts an airflow flowing between the main aerodynamic body and the flight control surface; and
      an actuator coupled to the translating body and disposed within the flight control surface, wherein, upon actuation of the actuator, the translating body moves relative to the flight control surface.

10. The aircraft of claim 9, wherein:
    the flight control surface is pivotally coupled to the main aerodynamic body to facilitate pivotable movement of the flight control surface relative to the main aerodynamic body between a cruise configuration and a deflected configuration;
    the translating body is in the sealed position while the flight control surface is in the cruise configuration; and
    the translating body is in the retracted position while the flight control surface is in the deflected configuration.

11. The aircraft of claim 10, wherein:
    the flight control surface is aligned with a plane defined by the main aerodynamic body while in the cruise configuration; and
    the flight control surface is obliquely angled relative to the plane defined the main aerodynamic body while in the deflected configuration.

12. The aircraft of claim 10, further comprising a hinge pivotally coupling the flight control surface to the main aerodynamic body, wherein the hinge remains inside the main aerodynamic body while the flight control surface moves between the cruise configuration and the deflected configuration.

13. The aircraft of claim 9, wherein the main aerodynamic body is one of a wing, a horizontal stabilizer, a vertical stabilizer, or a canard.

14. The aircraft of claim 9, wherein the flight control surface is one of a flap, a flaperon, an aileron, an elevator, a rudder, or a ruddervator.

15. The aircraft of claim 9, further comprising a shroud pivotally coupled to the main aerodynamic body and configured to further define the gap.

16. The aircraft of claim 15, wherein a rotation between the shroud and the main aerodynamic body defines an overlap between an aftmost point on the shroud and a forward most point of the translating body that further adjusts the airflow.

17. A method for aerodynamic control, comprising:

coupling a flight control surface to a main aerodynamic body proximate a trailing edge of the main aerodynamic body;

coupling a translating body to the flight control surface, wherein the translating body is moveable relative to the flight control surface between a sealed position and a retracted position to define a gap between the main aerodynamic body and the translating body;

extending the translating body toward the main aerodynamic body while in the sealed position to close the gap;

retracting the translating body is away from the main aerodynamic body while in the retracted position to widen the gap, wherein the gap adjusts an airflow flowing between the main aerodynamic body and the flight control surface; and moving the translating body relative to the flight control surface with an actuator, wherein the actuator is coupled to the translating body and disposed within the flight control surface.

18. The method according to claim 17, further comprising:

pivotally coupling the flight control surface to the main aerodynamic body with a hinge, wherein the hinge remains inside the main aerodynamic body while the flight control surface moves between the cruise configuration and the deflected configuration.

19. The method according to claim 17, further comprising:

coupling a shroud pivotally to the main aerodynamic body to further define the gap.

20. The method according to claim 19, further comprising:

adjusting the airflow through the gap with a rotation between the shroud and the main aerodynamic body to adjust an overlap between an aftmost point on the shroud and a forward most point of the translating body.

\* \* \* \* \*